(12) United States Patent
Ladatto et al.

(10) Patent No.: US 7,649,034 B2
(45) Date of Patent: Jan. 19, 2010

(54) COATING POWDER COMPOSITIONS AND METHOD

(75) Inventors: Steven M. Ladatto, Lake Kiowa, TX (US); Travis O. Bush, Valley View, TX (US)

(73) Assignee: Spraylat Corporation, Pelham, NY (US)

( * ) Notice: Subject to any disclaimer, the term of this patent is extended or adjusted under 35 U.S.C. 154(b) by 268 days.

(21) Appl. No.: 10/992,305

(22) Filed: Nov. 18, 2004

(65) Prior Publication Data

US 2006/0106134 A1     May 18, 2006

Related U.S. Application Data

(63) Continuation-in-part of application No. 10/326,785, filed on Dec. 19, 2002, now abandoned, which is a continuation-in-part of application No. 10/102,216, filed on Mar. 20, 2002, now abandoned.

(51) Int. Cl.
   *C08K 9/00*    (2006.01)
   *C08K 3/30*    (2006.01)

(52) U.S. Cl. .................. 523/210; 523/217; 524/423

(58) Field of Classification Search .................. None
See application file for complete search history.

(56) References Cited

U.S. PATENT DOCUMENTS

| | | | | |
|---|---|---|---|---|
| 4,176,143 A * | 11/1979 | Kraft et al. | .................. | 525/463 |
| 4,916,188 A | 4/1990 | Reising | | |
| 5,256,493 A | 10/1993 | Szita et al. | | |
| 5,270,416 A * | 12/1993 | Toman et al. | ............... | 526/273 |
| 5,298,076 A * | 3/1994 | Babler | ........................ | 106/498 |
| 5,856,378 A | 1/1999 | Ring et al. | | |
| 6,133,344 A | 10/2000 | Blatter et al. | | |
| 6,146,145 A | 11/2000 | Itakura et al. | | |
| 6,406,528 B1 * | 6/2002 | Macholdt et al. | ......... | 106/31.49 |
| 6,531,524 B2 | 3/2003 | Ring et al. | | |
| 6,537,364 B2 * | 3/2003 | Dietz et al. | .................. | 106/493 |
| 6,802,641 B2 | 10/2004 | Ladatto et al. | | |
| 6,989,056 B2 * | 1/2006 | Babler | ........................ | 106/413 |
| 7,151,123 B2 * | 12/2006 | Ramsey | ....................... | 522/96 |
| 2003/0181570 A1 | 9/2003 | Ladatto | | |
| 2003/0191230 A1 | 10/2003 | Ladatto | | |

FOREIGN PATENT DOCUMENTS

EP    0 845 507 A    6/1998

OTHER PUBLICATIONS

Richart, Douglas S; Encyclopedia of Polymer Science and Technology, Coatings Methods, Powder Technology, Oct. 2001, vol. 5, pp. 570-603.*

European Search Report, Jul. 2, 2003, issued for European patent application counterpart of above application and its C-I-P application, U.S. Appl. No. 10/326,785 filed Dec. 19, 2002.

The Shephard Color Company, StarLight FL105 Technical Data Sheet, May 13, 2003.

European Search Report, Mar. 20, 2006, issued for European patent application counterpart of above application.

* cited by examiner

*Primary Examiner*—Monique R Jackson
(74) *Attorney, Agent, or Firm*—Gerald K. White

(57) ABSTRACT

The present invention is directed to a coating powder base composition having a viscosity of between about 2 to about 85 Pa·s and including a particulate organic pigment tinting agent. Such base composition can be produced in large batches and then smaller portions of such batches can be mixed with a tinting agent comprising solid organic pigment particles characterized by a maximum surface index of about 50 to obtain a desired color for the final coating powder. The invention also includes methods for making such coating powders as well as for coating substrates using such coating powders.

42 Claims, No Drawings

COATING POWDER COMPOSITIONS AND METHOD

This application is a continuation-in-part of patent application Ser. No. 10/326,785, filed Dec. 19, 2002 now abandoned, which is a continuation-in-part of patent application Ser. No. 10/102,216, filed Mar. 20, 2002 now abandoned.

The present invention is directed to coating powder compositions and to methods for preparing and using novel powder coating compositions, which include admixing particles of a one or more solid organic pigment tinting agents to coating powder base compositions.

BACKGROUND OF THE INVENTION

It is known in liquid paint systems to add a tinting agent to a finished base composition to achieve a final colored paint composition. This technology permits the preparation of a large array of liquid custom color paints that can be created from a small number of finished base compositions. In coating powder paint systems, the addition of a tinting agent to a coating powder base composition is more difficult and generally requires extrusion, grinding, or sieving to adequately mix the dry components. Otherwise, when a coating powder base and tinting agent are mixed, resultant coatings having poor flow, inconsistent color, and surface defects are obtained. It is believed that this well-recognized difficulty for coating powder systems is caused by low wetting properties of the coating powder base composition. Thus, it is a long standing problem in the coating powder industry to be able to produce coating powders that are capable of obtaining good quality coatings using the highly advantageous technique currently used for liquid paint systems.

Others have attempted to solve this significant, long-standing problem in the art with use of techniques that are distinct from that of the present invention. A more detailed description of such attempts is set forth below.

U.S. Pat. No. 5,856,378, granted to Ring et al., discloses a powder coating composition for providing a coating having certain appearance or performance attributes. The powder coating composition comprises composite particles that are agglomerates of individual particle components that have been fused or bonded together into composite particles which are air-fluidizable and do not break down under the mechanical and/or electrostatic forces encountered during their application to the substrate. The individual particulate components, present as discrete particles within the composites, comprise a first, solid, particulate component and one or more additional, solid, particulate components that differ from the first particulate component. Each particle of the first component comprises a solid polymeric binder system at least a portion of which is a resin in an amount sufficient to impart coatability to the composition. The particles of the additional components(s) containing at least one substance that provides, together with the first component, the certain appearance or performance attribute to the coating when processed into a coating with the first component, the identities, particle sizes and proportions of the components in the composition being selected such that, when the composition is applied to a substrate and heated to form a continuous coating, a coating having the certain appearance or performance attribute is formed.

U.S. Pat. No. 6,133,344, granted to Blatter et al., discloses a colored pulverulent coating composition comprising spherical particles having a mean particle size>40 um, in two or more different color tints. At least the particles of one tint are colored and the particles of the other tint may be colorless. The particles employed for the mixture each have a monomodal particle size distribution with a span (d90-d10/d50) of <2.5 and the pulverulent coating composition can be melted at temperatures<200° C. to form a continuous coating. The differences in color that stem from the different-colored particles are indistinguishable to the human eye in the cured coating.

U.S. Pat. No. 6,146,145, granted to Itakura et al., discloses a method of producing a color-matched powder coating. The method comprises providing a colored light-transmittable powder coating that is colored by a coloring agent and a colorless light-transmittable powder coating containing no coloring agent. A blending ratio is calculated of the colored powder coating and the colorless powder coating. The colored powder coating and the colorless powder coating are weighed on the basis of the calculating step. The powder coating is dry blended using a mixer.

U.S. Pat. No. 6,531,524, granted to Ring et al., discloses a powder coating composition comprising a film-forming polymeric component having a d(v,50) in the range of from 25 to 50 microns or a d(v,70) in the range of from 25 to 70 microns. The composition includes at least one appearance modifying additive and a further additive, which may be alumina, together with aluminium hydroxide, wax coated silica, or a combination thereof. Ring et al. does not appear to use a coating powder base composition having a viscosity from about 2 to about 85 Pa·s that may be subsequently mixed with a particulate organic pigment tinting agent.

EPO 0 845 507 A relates to mixing two or more powder coatings of different color to provide a cured coating of a homogenous hue. On the other hand, the claimed invention relates to mixing a base composition having a viscosity from about 2 to about 85 Pa·s with a particulate organic pigment-tinting agent.

U.S. Patent Publication No. US-2003-0181570, of Ladatto, published Sep. 25, 2003, entitled Coating Powder Compositions and Method and U.S. Patent Publication No. US-2003-0191230, of Ladatto, published Oct. 9, 2003, entitled Coating Powder Compositions and Method, both relate to coating powder compositions, methods for making such coating powders, and coatings made from such products. Applicant believes that such patent publications are more closely related to the present invention than the respective coating powders and manufacturing methods described in the three above-mentioned U.S. patents. The two U.S. patent publications are assigned to the assignee of the present patent application.

The two above-mentioned patent publications involve the production of coating powders by providing a base composition powder comprising a resin having a viscosity from about 2 to about 85 Pa·s (Pascal-seconds) and then mixing the base composition powder with either an inorganic tinting agent or an organic polymer soluble dye tinting agent to obtain a coating powder having a desired color. Inorganic tinting agents include mixed metal oxides, titanium dioxide, and hybrid organic-inorganic materials. Organic polymer soluble dyes are referred to as "solvent dyes" and include perinone colorants.

The present invention may be advantageously used with a wide variety of coating powder compositions including thermosetting, thermoplastic, radiation curable, and dual systems such as thermosetting/radiation curable and fluorocarbon polymer thermosetting systems. Once a base coating powder having sufficient wetting properties, as measured by viscosity, is produced, particles of a solid organic pigment-tinting agent are then mixed with such particulate base coating powder to produce a desired color. An important commercial advantage of the invention is that a base coating powder can be produced and then stored to await the final, color-producing mixing step. To be able to obtain a desired colored powder by simply mixing a base composition and an organic pigment permits pre-production of large quantities of the base composition and then the subsequent use of a portion of such base to obtain a desired color rather than having a single production run capable of producing only one color. Obviously, shorter production and delivery times are possible with the invention. Moreover, if a coating powder manufacturer is in the midst of a production run of a given color, the only alternative to being able to quickly produce a different color could be to interrupt the run, clean the equipment, and then produce the other color. Then the equipment would require cleaning once more to produce the balance of the first run. This substantial problem is improved with the present invention, although addressed by the two above-mentioned patent publications. The present invention and that of the two patent publications enable a wide variety of colored powders to be quickly produced and shipped to customers without interruption of the base composition production run. The present invention enables such production and shipment to be accomplished with increased efficiency.

While Applicant considers that the above-described coating powders and method of making such coating powders disclosed in the two patent publications successfully address the several long standing problems in the art that are mentioned above, Applicant believes that the coating powders, method of making such coating powders, and coatings made therefrom of the present application constitute a significant improvement. Such improvement is manifested by improved properties in the coating powder and resultant coated substrate, and by several processing advantages. Such improvement is achieved by the substitution of particulate solid organic pigment tinting agents for the inorganic tinting agents and organic polymer soluble dye-tinting agents described by the two patent publications. Such substitution results in a superior product that is quite distinct from that of the two patent applications. Increased simplicity in manufacture is also achieved by the present invention.

Several significant product advantages result from the use of organic pigment tinting agents rather than inorganic tinting agents. When organic pigment tinting agents are utilized instead of inorganic tinting agents, less coloring agent is required to obtain the same color in most instances. Secondly, organic pigment tinting agents have a lower specific gravity than inorganic tinting agents. Such lower specific gravity is more closely related to the specific gravity of the base composition than that of the inorganic tinting agents. When the inorganic tinting agents disclosed in the two patent publications are added to base compositions, there is a tendency for the inorganic tinting agent particles to float and segregate at the top of the base composition. Incorporation of the lower specific gravity organic pigment tinting agents results in a uniform distribution of the pigment throughout the cross section of the cured coating. Uniformity is a significant advantage when it is considered that when a coating containing an inorganic tinting agent becomes scratched to a depth below the area containing the segregated tinting agent, the scratch becomes noticeable because of the difference in color at the lower regions of the scratch and the surface. On the other hand, the same scratch depth would not show such difference in color if a coating containing organic pigment tinting agents were utilized because color uniformity is exhibited throughout the coating. Typically, organic pigment tinting agents are significantly smaller than inorganic pigment tinting agents, i.e., on the order of about five to about ten times smaller. In general, there are more pigment particles in one gram of organic pigment than in one gram of inorganic pigment. Thus, lesser quantities in terms of mass of organic pigment tinting agents need be added to the base composition to produce a given color. The ability to use organic pigments in addition to inorganic pigments in matching a given color increases the opportunity to formulate a color match that is not metameric. Metamerism is the characteristic where two colors match in one light source but not in another. In general, coatings made with organic pigments will exhibit less metamerism when the target color is made from organic pigments. Previous publications, where inorganic pigments were used exclusively, resulted in metameric color matches.

Significant processing advantages are achieved through the use of organic pigment tinting agents rather than inorganic tinting agents. Because clear, unpigmented base compositions may be utilized when organic pigment-tinting agents are subsequently added, the need for an array of colored base compositions is significantly reduced. On the other hand, clear base compositions are not normally as suitable when inorganic tinting agents are used because some inorganic tinting agents lack opacity. As mentioned previously, because organic pigment tinting agents are generally more opaque than inorganic tinting agents, organic pigment tinting agents constitute a more potent colorant. For example, when matching a dark gray color using inorganic tinting agents, a dark gray base would be mixed with inorganic tinting agents to create the desired color match. When using organic tinting agents, a clear base would be mixed with organic tinting agents to create the same dark gray color match. The use of a clear base in combination with organic tinting agents eliminates the need for the dark gray base as well as many other color bases. In general, the reason why organic pigments are useful in combination with a clear base and inorganic pigments are not as useful is that organic pigments contain more color strength and opacity at lower use levels than inorganic pigments.

Organic polymer soluble dyes that may be utilized as tinting agents are sold by Clariant under the trade names Sandoplast, Solvaperm, Hostasol, Estofil, and Polysynthren. Such materials are chemical compounds that impart coloration to polymeric coatings by way of solubility. Such compounds are different from pigments in that these dyes completely dissolve within the matrix of the resin system of the coating. Organic polymer soluble dyes such as disclosed in previously mentioned Patent Publication No. US-2004-0096669, may encounter compatibility problems with the base composition and result in a spotty, non-uniform appearance. No such problem exists with certain organic pigment-tinting agents. Moreover, when a clear coat is applied over a base coat containing organic polymer soluble dyes, such dyes tend to bleed because the dye is soluble. Most organic pigment tinting agents will not so bleed. Thus, if one were to provide a clear topcoat over a colored coating, bleeding problems of the colored coating into the clear topcoat would be encountered should organic polymer solvent dyes be utilized. Obviously, such problem would not exist with most organic pigment tinting agents.

The chemical family of organic polymer soluble dyes is referred to as "solvent dyes". The red dye, e.g. Sandoplast Red G, is known as perinone colorant (syn: Solvent Red 135, CAS #20749-68). Examples of such solvent dyes include, but are not limited to, Sandoplast Red G, Sandoplast Red BB, Polysynthren Blue, and Polysynthren Green.

SUMMARY OF THE INVENTION

The present invention is directed to base coating powder compositions capable of being applied to a substrate to form a coating having uniform color throughout, and further characterized by a chromaticity of a maximum of about 100, comprising a resin; an optional effective amount of a resin modifying agent to obtain a viscosity of the base composition of between about 2 to about 85 Pa·s (Pascal-seconds); and a particulate solid organic pigment tinting agent having a maximum particle surface index of about 50. The base composition has a viscosity range of from about 2 to 85 Pa·s (measured using an ICI cone plate viscometer set at 160° C.) to achieve the necessary wetting properties that will permit uniform mixing of the base with the solid organic pigment particles to produce a coating powder mixture that can be readily applied to a substrate to produce high quality coatings. The resin may be formulated to the above-specified viscosity or such viscosity may be obtained by incorporating a resin-modifying agent into the base composition.

The base composition is produced by conventional means such as mixing its respective constituents, extruding the mixture, and grinding the extrudate into a powder, and then optionally classifying the coating powder. The solid organic pigment particles are characterized by a particle surface index of a maximum of about 50. Particle surface index is defined as the particle size (microns) times the surface area of one gram of the particles (meters$^2$/gram).

Particle surface index (PSI) is defined as follows:

$PSI=D_{50} \times A_s$, where $D_{50} \leq 2.5$;

where $D_{50}$=Average Particle Size (microns); and
where $A_s$=Surface Area (m$^2$/g)

At least one type of solid organic pigment particles is mixed with the base composition, preferably by dry mixing, to form a final coating powder composition mixture having a desired color. Obviously, a desired color may be obtained through use of several pigments.

The coating powder composition mixture may be electrostatically charged, applied to a substrate, and cured, if necessary, to produce a good quality coating of a desired color. The resultant coating exhibits a uniform distribution of the organic pigment particles throughout and is further characterized by a chromaticity of a maximum of about 100.

DETAILED DESCRIPTION OF THE INVENTION

The present invention pertains to coating powder base compositions that can be admixed, preferably in the dry state, with a particulate solid organic pigment tinting agent having particles characterized by a maximum particle surface index of about 50 to prepare a final coating powder. In manufacturing most conventional coating powder compositions, tinting agents are added to coating powder, along with other ingredients, before further processing such as premixing, extrusion, cooling, grinding, classifying, and sieving. In the present invention and in the two above-mentioned patent publications, tinting agents are added to coating powder base compositions in a finished state, followed by a short mixing cycle. No other processing is required. The solid organic pigment particle tinting agents of the present invention are compounds that can be readily post-mixed with coating powder base compositions to prepare the final coating powder mixture compositions. The ability to post-mix these solid, dry tinting agents with a dry base composition enables the creation of a final coating powder of virtually any color, gloss, texture, structure, lubricity, or conductivity, thereby greatly reducing the time to produce a given color and also reducing the number of finished coating powders that need to be stored in inventory. The properties of the base compositions may vary in color, gloss, or texture but are formulated so that dry materials can be introduced by a post-addition method. It is also contemplated and preferred that the base composition may be clear rather than colored or tinted because a smaller number of color bases are required to be kept in inventory to have the ability to obtain a given number of coating colors.

Any coating powder may be suitably used in the practice of the invention, including thermosetting; thermoplastic; radiation curable, especially such as those cured by UV or IR; dual curing coatings, such as those curable by thermal and radiation means; and fluorocarbons.

Thermosetting coating powders suitable for use in the invention are well known in the art and include resins such as epoxy resins, polyester resins, urethane resins, acrylic resins, and fluorocarbon resins.

Thermosetting resins which may be employed in the present invention may be any thermosetting resin that has sufficient wetting properties so as to yield a thermosetting coating powder base composition that can be readily admixed with the particulate organic pigment tinting agents of the invention. Thermosetting resins are materials that polymerize by the action of heat into a permanently solid and relatively infusible state. Thermosetting resins having high flow and low viscosity provide the best results in the present invention. Non-limiting illustrative thermosetting resins may be selected from the group consisting of alkyds, acrylics, aminos (melamine and urea), epoxys, phenolics, polyesters (carboxyl, hydroxyl, and hybrid), silicones, and urethanes.

Alkyd resins are prepared by esterification of a polybasic acid with a polyhydric alcohol to yield a thermosetting hydroxycarboxylic resin. Glycerol and pentacrythritol are the most common polyhydric alcohols for alkyd resins. Mixtures of pentacrythritol and ethylene glycol may be used to prepare medium and short oil alkyds with good compatibility properties, gloss retention, and durability. Polyols such as sorbitol and diethylene glycol may also be used. The most important polybasic acids for alkyd resins are phthalic acid and isophthalic acid. Other dibasic acids used in alkyd resins to impart special properties are adipic acid, azelaic acid, sebacic acid (to impart flexibility), tetrachlorophthalic anhydride, and chlorendic anhydride (to impart fire-retardant properties).

Acrylic resins are prepared by the polymerization of acrylic derivatives such as acrylic acid, methyl acrylate, ethyl acrylate, methacrylic acid, methyl methacrylate, glycidol methacrylate, and ethyl methacrylate. Suitable acrylic resins are Reichhold A249a (Reichhold Chemicals, Inc.), Reichhold A-229-A (Reichoold Chemicals, Inc.), and Anderson P7610 (Anderson Development Co.).

Amino resins are prepared by the addition reaction between formaldehyde and compounds such as aniline, ethylene urea, dicyandiamide, melamine, sulfonamide, and urea. The urea and melamine compounds are most widely used. There are many types of amino resins. Ethyleneurea H resin, based on dimethylolethyleneurea (1,3-bis(hydroxymethyl)-2-imidazolidinone), is prepared from urea, ethylenediamine, and formaldehyde. Propyleneurea-formaldehyde resin, 1,3-bis(hydroxymethyl)-tetrahydro-2(1H)-pyrimidinone, is prepared from urea, 1,3-diaminopropae, and formaldehyde. Triazone resin is prepared from urea, formaldehyde, and a primary aliphatic amine, usually hydroxyethylamine. Uron resins are mixtures of a minor amount of melamine resin and uron, predominantly N,N'-bis(methoxymethyl)uron plus 15-25% methylated ureaformaldehyde resins. Glyoxal resins, based on dimethyloldihydroxyethylencurea in which methanol groups are attached to each nitrogen, are prepared from urea, glyoxal, and formaldehyde. Melamine-formaldehyde resins include the dimethyl either of trimethylolmelamie. Methylol carbamate resins are derivatives made from urea and an alcohol, the alkyl group can vary from a methyl to a monoalkyl ether of ethylene glycol. Other amino resins include methylol derivatives of acrylamide, hydantoin, and dicyandiamide.

Epoxy resins are generally prepared by reaction of an epoxide and an alcohol. Structurally, the epoxy groups are three-membered rings with one oxygen and two carbon atoms. The most common epoxy resins are made by reacting epichlorohydrin with a polyhydroxy compound, such as bisphenol A. Epoxy resins produced in this manner are called diglycidyl ethers of bisphenol A (bis0A). Changing the ratio of epichlorohydrin to bis-A, changes the resin range from low-viscosity liquids to high-melting solids. The epoxy phenol novolak resins, novolak resins whose phenolic hydroxyl groups have been converted to glycidyl ethers, are the most important. Epoxy resins are cured by cross-linking agents such diethylenetriamine, triethylenetetramine, tetraethylenepentamine, diethylaminopropylamine, and piperazines. Suitable epoxy resins are Ciba-Geigy GT-9013 (Vantico Inc.), GT-7014 (Vantico Inc.), GT-7074 (Vantico Inc.), and Kukdo 242G (Kukdo Chemical Co. Ltd.).

Phenolic resins are prepared by the reaction of phenols and aldehydes, often with the use of hexamethylenetetramine as a curing agent. Phenolic compounds may be reacted with a wide variety of aldehydes and other compounds to yield many modified polymers. The reaction of a phenol with an aldehyde (generally that between phenol and formaldehyde) leads to the formation of two classes of phenolic resins, novolacs and resols. Novolacs are prepared with an acid catalyst and substantially less than one mole of aldehyde per mole of phenol and require the addition of a curing catalyst to become thermosetting. Resols are prepared with from 1 to 3 moles of aldehyde per mole of phenol and employ a basic condensation catalyst and are inherently thermosetting.

Polyester resins (carboxyl, hydroxyl, and hybrid) are prepared by reacting unsaturated dibasic acids (unsaturated acids or anhydrides) with polyhydric alcohols. Preferred carboxyl polyester resins are Crylcoat 7304 (UCB Chemicals Corp.), Crylcoat 2405-0 (UCB Chemicals Corp.), Crylcoat 7409-0 (UCB Chemicals Corp.), Crylcoat 7337 (UCB Chemicals Corp.), Rucote 905 (Ruco Polymers), and Rucote 915 (Ruco Polymers). Preferred hydroxyl polyester resins are Rucote 102 (Ruco Polymers), Rucote 104 (Ruco Polymers), Rucote 112 (Ruco Polymers), Crylcoat 2890-0 (UCB Chemicals Corp.), Crylcoat 2891-0 (UCB Chemicals Corp.), and Crylcoat 4890-0 (UCB Chemicals Corp.). Hybrid polyester resins may also be employed such as Rucote 551 (Ruco Polymers), Rucote 560 (Ruco Polymers), Rucote 570 (Ruco Polymers), and Crylcoat 1701-0 (UCB Chemicals Corp.).

The di- and tri-basic acids that may be employed in the carboxyl polyester resins include 1,2-benzenedicarboxylic acid (88-99-3), 1,3-benzenedicarboxylic acid (121-91-5), 1,3-benzenedicarboxylic acid, dimethyl ester (1459-9304), 1,4-benzenedicarboxylic acid (100-21-0), 1,4-benzenedicarboxylic acid, diethyl ester (636-09-9), 1,4-benzenedicarboxylic acid, dimethyl ester (120-61-6), 1,2,4-benzenetricarboxylic acid (528-44-9), butanedioic acid (110-15-6), butanedioic acid, diethyl ester (123-25-1), butanedioic acid, dimethyl ester (106-65-0), 2-butenedioic acid (E)- (110-17-8), hexanedioic acid (124-04-9), hexanedioic acid, dimethyl ester (627-93-0), hexanedioic acid, diethyl ester (141-28-6).

The polyols that may be employed in the carboxyl polyester resins include 1,3-butanediol (107-88-0), 1,4-butanediol (110-63-4), 1,4-cyclohexanedimethanol (105-08-8), 1,2-ethanediol (107-21-1), ethanol, 2,2'-oxybis- (111-46-6), 1,6-hexanediol (629-11-8), 1,3-pentanediol, 2,2,4-trimethyl- (144-19-4), 1,2-propanediol (57-55-6), 1,3-propanediol, 2,2-bis(hydroxymethyl)- (115-77-5), 1,3-propanediol, 2,2-dimethyl- (126-30-7), 1,3-propanediol, 2-ethyl-2-(hydroxymethyl)- (77-99-6), 1,3-propanediol, 2-(hydroxymethyl)-2-methyl- (77-85-0), 1,3-propanediol, 2-methyl (2163-42-0), 1,2,3-propanetriol (56-81-5).

Silicone resins are highly cross-linked siloxane systems. Silicone resin chemistry is based on the hydrides, or silanes, the halides, the esters, and the alkyls or aryls. The silicon oxides are composed of networks of alternate atoms of silicon and oxygen so arranged that each silicon atom is surrounded by four oxygen atoms and each oxygen atom is attached to two independent silicon atoms. The crosslinking components are usually introduced as trifunctional or tetrafunctional silanes in the first stage of preparation. The cure of silicone resins usually occurs through the formation of siloxane linkages by condensation of silanols.

Polyurethane resins are prepared by the reaction of a polyisocyanate with a polyol. Polyurethane resins contain carbamate groups or urethane groups, —NHCOO—, in their backbone. Illustrative polyisocyanates include ethylene diisocyanate; ethylidene diisocyanate; propylene diisocyanate; butylene diisocyanate; hexamethylene diisocyanate; toluene diisocyanate; cyclopentylee-1,3,-diisocyanate; 3-isocyanatomethyl-3,5,5-trimethylcyclohexyl isocyanate; 3-isocyanatomethyl-3,5,5-trimethylcyclohexyl isocyanate cyanurate; cyclohexylene-1,4-diisocyanate; yclohexylene-1,2-diisocyanate; 4,4'-diphenylmethanediisocyanate; 2,2-diphenylpropane-4,4'-diisocyanate; p-phenylene diisocyanate; m-phenylene diisocyanate; xylylene diisocyanate; 1,4-naphthylene diisocyanate, 1,5-naphthylenediisocyanate; diphenyl-4,4'-diisocyanate, azobenzene-4,4'diisocyanate; diphenylsulphone-4,4'-diisocyanate; dichlorohexamethylene diisocyanate; furfurylidene diisocyanate; 1-chlorbenzene-2,4,diisocyanate; 4,4',4''-triiiisocyanato-toluene and 4,4'-dimethyldiphenylmethant-2,2',5,5-tetraisocyanate, and the like. Illustrative polyols include polyhydroxy ethers (substituted or unsubstituted polyalkylene ether glycols or polyhydroxy polyalkylene ethers), polyhydroxy polyesters, the ethylene or propylene oxide adducts of polyols, and the monosubstituted esters of glycerol.

Functionally reactive fluorocarbon polymer powders, may be utilized in the invention. Such polymer typically comprises copolymerized ethylenically unsaturated monomers containing carbon-to-carbon double bond unsaturation including minor amounts of hydroxylated vinyl monomers and major amounts of fluorocarbon monomers. Such functional fluorocarbon polymer may be adapted to be cross linked with a blocked isocyanate cross linking resin. Such resins may further contain hydroxyl functional acrylic polymers or polyester polymers that can co react with the unblocked diisocyanate upon thermal curing of the powder. Such coating powders are further described in U.S. Pat. No. 4,916,188, granted to Reising.

Thermoplastic coating powders suitable for use in the invention are well known in the art and may include vinyls, polyolefins, nylons, polyesters, etc.

Radiation curable coating powders suitable for use in the present invention are well known in the art. One important class of radiation curable coating powder is UV curable powders. UV curable powders have the ability to flow and cure and produce smooth coatings at much lower temperatures than previously possible with traditional thermosetting coating powders. This ability is primarily due to the curing reaction being triggered by photo-initiated radiation rather than heat. Typically, UV powders are formulated from solid unsaturated base resins with low Tg, such as unsaturated polyesters; unsaturated co-polymerizable crosslinker resins, such as vinyl ethers; photoinitiators; flow and leveling agents; performance-enhancing additives; and, if necessary, pigments and fillers. It is also common in the coating powder art to replace all or part of the base resins or crosslinkers with crystalline materials to provide powders with lower melt viscosity and better flow out behavior.

As is the case with thermosetting coating powders, UV curable coating powders may be applied to a substrate in the usual fashion, with use of electrostatic spray techniques and then cured by exposure to radiation.

In another type of curing, a coated substrate is heated for as long as required to drive out substrate volatiles and fuse the powders into a smooth molten coating. Immediately following fusion, the molten coating is exposed to UV light, which, in an instant, cures and hardens the applied powder into a durable, extraordinarily smooth, attractive coating. In this instance, a dual cure involving both thermal and radiation curing is used.

The amount of resin used in the coating powder base composition may vary depending upon the particular resin employed as well as for the particular end use of the coating power base composition. In general, the resin is typically present in the coating powder base composition in an amount from about 40% to about 95%, preferably from about 50% to about 85%, more preferably from about 55% to about 75%, and most preferably from about 60% to about 70%, by weight of the coating powder base composition, depending upon color.

Curing agents, which may be employed in the present invention, may be any curing agent that provides sufficient cross-linking for curing. Non-limiting illustrative curing agents for thermosetting resins include TGIC—Araldite PT-810 (Ciba-Geigy); polyurethane—Alcure 4400 (Eastman Chemical); Creanova B-1530 (Creanova), Creanova B-1540 (Creanova); Epoxy—Dicy CG-1200 (461-58-5) (Aldrich Chemical Co., Inc.), Ciba-Geigy HT-2844 (93-69-6) (Vantico), Crenova B-68 (Creanova), and Creanova B-55 (Creanova).

The amount of curing agent used in the thermosetting coating and/or radiation curable powder base compositions may vary depending upon the particular curing agent and resin employed as well as for the particular end use of the coating powder base composition. A curing agent is typically present in the thermosetting coating powder base composition in an amount effective to cure the resin, typically from about 2 to about 40 phr, preferably from about 5 to about 35 phr, more preferably from about 10 to about 25 phr, and most preferably from about 15 to about 20 phr if the curing agent is used.

Thermoplastic coating powders require no curing agent as such powders are applied to a substrate and then melted by heating and then cooled to form a coating.

Resin modifying agents which may be optionally employed in the present invention include any modifying agent that lowers the viscosity of the resin and thereby provides sufficient wetting properties to yield a coating powder base composition that can be readily admixed with tinting agents and additives. Resin modifying agents suitable for use in the invention include the following: alkylammonium salts of polyfunctional polymers, polysiloxane copolymers, 1,4-cyclohexane dimethanol dibenzoate, acrylic homopolymers, acrylic copolymers, salts of alkyl amide esters, and all of the above resin modifying agents with or without mixing with silica. Silica is useful to place the agents in powder form. Non-limiting illustrative resin modifying agents may be selected from Synthrowet PA-100 (Synthron Inc.), Crayvallac PC (Ray Valley Ltd.), and Piioester 4360-40 (Pioneer Plastics, Inc.).

A viscosity range of from about 2 to about 85 Pa·s is suitable, with a range from about 10 to about 50 Pa·s being preferred, and a range from about 15 to about 30 Pa·s being most preferred. The above preferences lead to coating powders having optimized coating properties. Lower viscosities permit the inclusion of larger amounts of tinting agents. However, viscosities at the lower end of the about 2 to about 85 Pa·s range, tend to produce lesser quality coatings because of excessive flow.

The amount of resin modifying agent used in the coating powder base compositions of the present invention is an amount effective to obtain the desired viscosity in the base composition. Typically up to about 10 phr is effective to provide sufficient viscosity to yield a coating powder base composition that can be readily admixed with tinting agents and additives in a dry state and form a good quality coating. The amount of resin modifying agent used in the coating powder base composition may vary depending upon the particular resin modifying agent and resin employed as well as for the particular end use of the coating powder base composition. The resin modifying agent present in the coating powder base composition in an amount effective to obtain the desired viscosity, typically up to about 10 phr. Typically, the resin modifying agent is present from about 0.1 to about 5 phr, preferably from about 0.5 to about 4 phr, more preferably from about 0.8 to about 3 phr, and most preferably from about 1 to about 2 phr.

Flow additive agents, which may be optionally employed in the present invention, may include any flow additive agent that promotes the flow of the coating powder base compositions thereby providing good resultant coating properties. Non-limiting illustrative, well-known flow additive agents include Modafow III (9003-01-4) (Solutia Chemicals, Inc.), Modaflow 2000 (Solutia Chemicals, Inc.), and Silwet L6705 (OSI Specialties, Inc.).

The amount of flow additive used in the coating powder base compositions of the present invention is an amount effective to promote the flow of the coating powder base compositions, thereby providing good mixing properties. The amount of flow additive used in the coating powder base composition may vary depending upon the particular flow additive agent and the resin employed as well as for the particular end use of the coating powder base composition. Typically, the flow additive, when present in the coating powder base composition, is in an amount from up to about 5 phr, preferably about 0.2 to about 5 phr, more preferably from about 0.3 to about 4 phr, even more preferably from about 0.5 to about 3 phr, and most preferably from about 1 to about 2 phr.

Degassing agents, which may be optionally employed in the present invention, include any degassing agent that promotes degassing of the coating powder base compositions thereby providing smooth coating properties. Non-limiting illustrative, degassing agents may be selected from benzoin, Uraflow B (Aldrich Chemical Co., Inc.), and Troy EX-542 (Troy Corp, USA). Preferably, the degassing agent is benzoin or Troy EX-542.

The amount of degassing agent used in the coating powder base compositions of the present invention is an amount effective to promote the degassing of the coating powder base compositions, thereby providing smooth coating properties. The amount of degassing agent used in the coating powder base composition may vary depending upon the degassing agent and the resin employed as well as for the particular end use of the coating powder base composition. Typically, the degassing agent is present in the coating powder base composition up to about 2 phr, preferably from about 0.2 to about 1.5 phr, more preferably from about 0.4 to about 1.2 phr, and most preferably from about 0.5 to about 1 phr.

Although it is preferred to utilize clear base compositions for reasons stated above, organic or inorganic pigment tinting agents may be optionally included in the base composition of the present invention. Such pigments may be white, gray, black, red, orange, yellow, blue, violet, or any other desired color. Such pigments are well known and commercially available. Pigment-free clear base compositions are also contemplated.

Organic pigment tinting agents include PV Fast Blue A2R, PV Fast Blue A4R, PV Fast Blue BG, PV Fast Blue B2GA, Paliogen Blue L6385, Paliogen Blue L6470,k Heliogen Blue L6875F, Heliogen Blue L6989F, Irgalite Blue BCFR, Irgalite Blue 2GW, Irgalite Blue PDS6, Irgalite Blue GLSM, Heliogen Green L8605, Heliogen Green L8730, Heliogen Green L9361, PV Fast Green GNX, Hostaperm Green GG-01, PV Fast Red HF4B, Novaperm F5RK, Novaperm F3Rk-70, Novaperm Red BLS02, Paliogen Red L3885, Paliogen Red L3910HD, Irgazin Red BPT, Irgalite Red FBL, Cromophtal Red A2B, Cromophtal Orange 2g, Irgazin Orange 5R, Paliotol L2930HD, Sico Orange L3052HD, Novaperm Orange H5G70, Novaperm Orange HL, Novaperm Yellow FGL, Hanso Yellow 10G, Novaperm Yellow M2R70, Novaperm Yellow 4TG, Paliotol Yellow L1970, Paliotol Yellow L0960, Cromophtal Yellow 8GN, Irgazin Yellow 5GT, Monastral Magenta RT243D, Monastral Violet R RT201D, permanent Bordeaux FGR, PV Fast Violet ER, Paliotol Black L0086, Black Pearls 2000, Raven 14, Raven 1255, Monarch 1300, and Black FW-200.

Inorganic pigment tinting agents include lithopone, zinc oxide, titanium dioxide, mixed metal oxides, umbers, ochres, siennas; and white inorganic tinting agents such as R-700 White, R-706 White, R-960 White, Kronos 2310, Tioxide RL-6, and White TR-93. Other inorganic pigment tinting agents may be utilized.

Organic and/or inorganic pigments impart a color to the base composition and thus permit subsequent color variations when particles of solid organic pigment tinting agents having a maximum surface index of about 50 are mixed with the base composition. Such combination of pigment tinting agents permits varying degrees of chromaticity. Should pigments not be included in the base composition, inorganic tinting agents generally produce a translucent color of low chromaticity. However, organic pigments are capable of producing an opaque color of high chromaticity. When these tinting compounds are added to the coating powder base composition, a microscopic matrix is created, and the color the naked eye sees is the sum of the different tinting agent particles in conjunction with the base. For example, when a white base is crowded with small black tinting particles, the naked eye will see gray. It is this principle along with different colored bases and tinting agents that permits the creation of the colors produced by this technology. However, pigment-less clear base compositions are preferred due to simplicity in subsequent color selection and the lack of need for pigmented base composition.

When a pigmented base composition is used, the amount of pigment used in the coating powder base compositions of the present invention is an amount effective to provide a desired color and opacity to the coating powder base composition. The amount of pigment used in the coating powder base composition may vary depending upon the particular resin employed as well as for the particular end use of the coating powder base composition. Typically, a pigment is present in the coating powder base composition in an amount up to about 50 phr, preferably from about 10 to about 30 phr, more preferably from about 15 to about 25 phr, and most preferably from about 17 to about 23 phr.

Extender pigments may also optionally be included in the coating powder base compositions and include but are not limited to barium sulfate (7727-43-7), and calcium carbonate (1317-65-3). Such pigments may be used as a filler, if desired.

When clear base compositions are utilized, it is preferred to have a viscosity in the lower portion of the general range of from about 2 to about 85 Pa·s. Such preferred range is from about 5 to about 50 Pa·s. The lower range is preferred because lower viscosity serves to assist the incorporation of larger quantities of organic pigment into the coating powder and thereby produces full hiding. Should viscosities greater than about 50 Pa·s be utilized, the subsequently coated substrate exhibits a detrimental orange peel appearance. Should the viscosities lower than about 2 Pa·s be utilized, the subsequent coating is hindered due to dripping of the resinous portion of the coating powder.

The tinting agents of the present invention are compounds used to tint or color a clear base composition or to change the color of an already colored coating powder base composition. The tinting agents have a positive color value and are in the form of dry particles. As set forth above, such tinting agents comprise solid organic pigment particles having a maximum particle surface index of about 50. A tinting agent may comprise mixtures of the above tinting agents.

Examples of suitable classes or types of organic pigment tinting agents include but are not limited to those set forth in the following Table:

| COLOR | PRODUCT NAME | COLOR INDEX | CHEMICAL COMPOSITION |
|---|---|---|---|
| Violet | PV Fast Violet RL | PV23 | Dioxazine |
| Green | PV Fast Green GNX | PG7 | Cu phthalocyanine |
| Black | Raven 14 | PB7 | Carbon black |
| Blue | PV Fast Blue A4R | PB15:1 | Cu phthalocyanine, α-modified |
| Blue | Heliogen Blue L7460 | PB16 | Metal free phthalocyanine |
| Blue | Paliogen Blue L6385 | PB60 | Indanthrone |
| Blue | Heliogen Blue L6700F | PB15:6 | Cu phthalocyanine, ε |
| Blue | Irgalite Blue GLVO | PB15:4 | Cu phthalocyanine Beta-modified |
| Blue | Irgalite Blue LGLD | PB15:3 | Cu phthalocyanine Beta-modified |
| Blue | Irgalite Blue X-3627 | PB15:2 | Cu phthalocyanine trichloro |
| Blue | Irgalite Blue X-3485 | PB15:1 | Cu phthalocyanine trichloro |
| Red | Paliogen Red K3911HD | PR178 | Perylene |
| Red | Paliogen Red L3880HD | PR178 | Perylene |
| Red | Paliogen Red L4120 | PR179 | Perylene |
| Red | Sico Red L3750 | PR3 | Toluidine |
| Red | PV Fast Red B | PR149 | Perylene |
| Red | PV Fast Red HB | PR247 | Azo pigment lakes |
| Red | Irgalite Red 3RS | PR112 | BON Arylamide |
| Red | Hostaperm Red Violet 3RL | PR257 | Metal complex |
| Red | Hostaperm Scarlet GO | PR168 | Anthanthrone |
| Red | Novoperm Carmine HF3C | PR176 | Benzimidazolone |

-continued

| COLOR | PRODUCT NAME | COLOR INDEX | CHEMICAL COMPOSITION |
|---|---|---|---|
| Red | Novoperm Red 2GLD70 | PR253 | Naphthol AS |
| Red | Novoperm Red HF3S | PR188 | Naphthol AS |
| Red | Novoperm Red HFT | PR175 | Benzimidazolone |
| Red | Novoperm Scarlet 4RF | PR242 | Disazo condensation |
| Red | Graphtol Red 2BN | PR262 | Disazo condensation |
| Red | Graphtol Red HF2B | PR208 | Benzimidazolone |
| Red | Inquesie Magenta RT-243-D | PR202 | Quinacridone |
| Red | Inquesie Scarlet RT-788-D | PR207 | Quinacridone |
| Red | Cromophtol DPP Coral Red C | PR255 | Diketo-pyrrolo-pyrrole |
| Red | Irgazin DPP Red BO | PR254 | Diketo-pyrrolo-pyrrole |
| Red | Cromophtol Pink PT | PR122 | Quinacridone |
| Red | Cromophtol Scarlet RN | PR1166 | AZO condensation |
| Red | Irgalite Bordeaux CM | PR52:2 | BON(Mn) |
| Yellow | PV Fast Yellow H2GR | PY191 | Azo pigment Lakes |
| Yellow | PV Fast Yellow H3R | PY181 | Benzimidazolone |
| Yellow | PV Fast Yellow H9G | PY214 | Bisacetoacetarylide |
| Yellow | PV Fast Yellow HG | PY180 | Benzimidazolone |
| Yellow | PV Fast Yellow HR | PY83 | Diarylide |
| Yellow | Hostaperm Yellow 6GL | PY173 | Isoindoline |
| Yellow | Hostaperm Yellow H5G | PY213 | Quinoxalinedione |
| Yellow | Novoperm Yellow 4G | PY155 | Bisacetarylide |
| Yellow | Novoperm Yellow F2G | PY194 | Benzimidazolone |
| Yellow | Novoperm Yellow H2G | PY120 | Benzimidazolone |
| Yellow | Graphtol Yellow GG | PY17 | Diarylide |
| Yellow | Graphtol Yellow H10G | PY81 | Diarylide |
| Yellow | Cromophtol Yellow GR | PY95 | Azo condensation |
| Yellow | Irgalite Yellow BAW | PY13 | Diarylide m-xylidide |
| Yellow | Irgazin Yellow 2GLTE | PY109 | Isoindolinone |
| Yellow | Irgazin Yellow 3RLTN | PY110 | Isoindolinone |

Preferred organic tinting agents include dioxazine violets, Cu phthalocyanine blues and greens, perylene reds, bisacetoacetarylide and Azo pigment yellows, and carbon blacks, and admixtures thereof. Such preference is because such tinting agents have greater pigment strength and chromaticity than inorganic pigments.

The amount of organic pigment tinting agent used in the coating powder base compositions of the present invention is an amount effective to tint the coating powder base composition to obtain a desired color. The amount of tinting agent used in the coating powder base composition may vary depending upon the particular tinting agent employed, whether or not a pigment is present in the base composition, and the particular end use of the coating powder base composition. In a typical embodiment, the tinting agent may be present in the coating powder base composition in an amount from about 0.001 wt % to about 30 wt %, based upon total weight of the final coating powder. Typically the organic pigment is present in an amount from about 0.25 wt % to about 5 wt %.

A maximum particle size of suitable organic pigments is about 2,500 nanometers, with 2,000 nanometers being preferred, and 500 nanometers even more preferred. Typical particle sizes range from about 50 nanometers to about 700 nanometers. In general, the smoother the surface of the particle, the better the dispersability of pigment agglomerates.

The particulate organic pigment-tinting agents of the invention should have a maximum particle surface index of about 50.

Particle surface index (PSI) is defined as follows:

$$PSI = D_{50} \times A_s, \text{ where } D_{50} \leq 2.5;$$

where $D_{50}$=Average Particle Size (microns); and where $A_s$=Surface Area (m$^2$/g)

The index is a measure of the dispersability of the organic pigment in the base composition. In general, the lower the index, the better the dispersability of organic pigment and subsequent uniformity of color in the coating. A maximum particle surface index of about 25 is preferred, with a maximum particle surface index of about 5, being even more preferred. A typical particle surface index is from about 1 to about 25.

A dispersing agent may be optionally included with either the base composition or incorporated with the organic pigment when mixing with the base composition. Dispersing agents contribute to improved pigment dispersion in the coating and thus are important to the appearance of the coating. Dispersing agents having a high Mohs hardness of from about 3 to about 7 are preferred because such hard agents act as an abrasive on the organic pigments, which, in turn, increase dispersion of the organic pigment during the mixing step. Typically, dispersion agents are included in amounts from about 1 wt % to about 30 wt %, based upon total weight of the coating powder composition mixture. However, it is preferred to include such agents in an amount of from about 5 wt % to about 15 wt %, based upon total weight of the coating powder composition mixture. Suitable dispersing agents include but are not limited to: barium sulphate, sodium potassium alumino silicate, wollastonite, and calcium carbonate. Barium sulphate and sodium potassium alumino silicate are preferred because the greater Mohs hardness provides greater abrasion, which leads to better dispersion during mixing.

The process of the invention may also be employed to produce coatings having a distinctive sparkling decorative finish. In this regard, metallic particles may be included with the base composition or incorporated with the organic pigment when mixed with the base composition. The combination of metallic particles with organic pigments having a maximum particle surface index of about 50 results in a very distinctive appearance. Coatings made with such metallic particle-containing coating powders exhibit a sparkled appearance against a deep background color typical of organic pigments. Such metallic particles include but are not limited to metal-, such as silver-, coated glass and metal particles such as aluminum, steel, copper, bronze, zinc, etc. Shepherd Color Company sells StarLight™ silver-coated glass flakes and silver-coated hollow ceramic and solid glass microspheres. StarLight™ FL105, FL500, FL90, FL44, FL37, HM72, and SM36 are suitable silver-coated products. Silver-coated glass flakes possess brilliant light reflecting properties and contribute sparkle and luster to coating powders. The flat glass flake substrate maximizes reflection and provides a solid base for the metallic appearance.

The coating powder composition mixture of the invention is made by mixing a particulate base composition comprising a resin, the base composition having a viscosity from about 2 to about 85 Pa·s with a tinting agent comprising solid organic pigment particles characterized by a maximum particle surface index of up to about 50 in an amount effective to color the base composition and achieve a desired color.

The tinting agents and additives can be mixed with the coating powder base composition by means of a conventional mixing vessel that imparts sheer on the materials, thereby producing a homogeneous mixture. A suitable high intensity mixer is commercially available from Henschel. A preferred mixing method and apparatus is depicted in U.S. Pat. No. 6,802,641, granted to Ladatto et al., on Oct. 12, 2004. Due to the fluid-like nature of the base powder, it behaves much like a liquid allowing thorough dispersion to occur in relatively short times. Considering the alternative of extrusion, which achieves dispersion only by very high temperatures in addition to mechanical shear, this method of dispersion is quite efficient because the product is ready for use after mixing and does not require any grinding or sieving.

The method of the invention may be further understood by reference to the following two examples. The first example pertains to the use of a tinted base composition, and the second example pertains to the use of a clear base composition.

EXAMPLE 1

The green polyester TGIC (triglycidyl isocyanurate) base shown in the table below is comprised of the following ingredients: 60% polyester resin with a viscosity of 23.5 to 34.5 Pas, 4.5% TGIC curing agent, 0.9% polyacrylate flow agent, 0.5% benzoin degassing agent, 0.09% carbon black tinting agent, 2.7% Cu phthalocyanine green tinting agent, 3.3% yellow tinting agent, 0.7% titanium dioxide white tinting agent, and 27.31% barium sulfate filler. All percentages are expressed as a weight percent, based upon total weight of the composition. The green polyester TGIC base is produced by mixing the above ingredients, extruding the mixture, grinding the extrudate into a powder, and then classifying the coating powder.

The green polyester TGIC base is lighter and less yellow than the RAL 6005 (Moss Green) standard. As shown in the example below, the green base is mixed with a small amount of carbon black tinting agent and bismuth vanadate yellow tinting agent along with a fluidizing additive (amorphous silica) in order to obtain a color match for RAL 6005. A conventional mixing vessel that imparts sheer on the materials is used to combine these ingredients for a time of one minute. A suitable high intensity mixer is commercially available from Henschel.

| INGREDIENT | WT. PERCENT |
| --- | --- |
| Green polyester TGIC base | 99.91 |
| Carbon black tinting agent | 0.01 |
| Bismuth vanadate yellow tinting agent | 0.01 |
| Amorphous fumed silica fluidizing additive | 0.07 |

EXAMPLE 2

The clear polyester TGIC base shown in the table below is comprised of the following ingredients: 91.6% polyester resin with a viscosity of 13.5 to 23.5 Pas, 6.9% TGIC, and 1.5% polyacrylate flow agent. All percentages are expressed as a weight percent, based upon total weight of the composition. The clear polyester TGIC base is produced by mixing the above ingredients, extruding the mixture, grinding the extrudate into a powder, and then classifying the coating powder.

As shown in the table below, the clear polyester TGIC base is mixed with carbon black tinting agent, Cu phthalocyanine green tinting agent, bismuth vanadate yellow tinting agent, titanium dioxide white tinting agent, and amorphous fumed silica fluidizing additive to produce the final color of RAL 6005 (Moss Green). A conventional mixing vessel that imparts sheer on the materials is used to combine these ingredients for a time of one minute. A suitable high intensity mixer is commercially available from Henschel.

Example 1 is preferred over Example for the following reason. Example 1 requires that a green polyester TGI base be maintained in stock. If a red, yellow, or blue powder color match is desired, a red, yellow, or blue polyester TGIC base would need to be maintained in stock for each required color. With Example 2, the red, yellow, or blue powder could potentially be made using only one clear polyester TGIC base. Therefore, the use of a clear polyester TGIC base, as in Example 2, eliminates the need for maintaining numerous colored polyester TGIC bases in stock.

| INGREDIENT | WT. PERCENT |
| --- | --- |
| Clear polyester TGIC base | 92.73 |
| Carbon black tinting agent | 0.2 |
| Cu phthalocyanine green tinting agent | 4.0 |
| Bismuth vanadate yellow tinting agent | 1.0 |
| Titanium dioxide white tinting agent | 2.0 |
| Amorphous fumed silica fluidizing additive | 0.07 |

Once the resinous base composition and organic pigment-tinting agent are mixed to form a coating powder, the powder is applied to a substrate and formed into a coating by well-known conventional processes. An electrostatic charge is normally imparted to the coating powder by a Corona discharge gun or by tribocharging equipment prior to application to the substrate. If the coating powder is thermoplastic, the applied powder is heated, permitted to melt, and then solidified by cooling. If the coating powder is curable, the applied powder is cured thermally or by exposure to radiation.

The thus formed organic pigment-containing coatings are characterized by a maximum chromaticity of about 100 when organic pigments having a maximum particle surface index of 50 are incorporated into the coating powder. Inorganic pigment containing coatings are characterized by a maximum chromaticity of about 40, with the exception of bismuth vanadate yellow. Bismuth vanadate yellow containing coatings have a maximum chromaticity of about 80. These characteristics are illustrated by the following comparative example. This example illustrates the fact that organic pigment-containing coatings are characterized by distinct chromaticity when contrasted with inorganic pigment-containing coatings.

EXAMPLE 3

The clear polyester TGIC base shown in Tables 1-3 below is comprised of the following ingredients: 91.6% polyester resin with a viscosity of 13.5 to 23.5% Pas, 6.9% TGIC hardener, and 1.5% polyacrylate flow agent. All percentages are expressed as a weight percent, based upon total weight of the composition. The clear polyester TGIC base is produced by mixing the above ingredients, extruding the mixture, grinding the extrudate into a powder, and then classifying the coating powder.

The clear polyester TGIC base is mixed with amorphous silica fluidizing additive and various organic and inorganic tinting agents at the ratios shown in Tables 1-3. A conventional mixing vessel that imparts sheer on the materials is used to combine these ingredients for a time of one minute. A suitable high intensity mixer is commercially available from Henschel.

All of the tinting agents shown in Tables 1-4 below are mixed with the same clear polyester TGIC base using the same mixing step described above. From Table 4, the inorganic bismuth vanadate yellow tinting agent produced a higher chromaticity final color than the organic bisacetoacetarylide yellow tinting agent. However, the bisacetoacetarylide produces a much higher chromaticity final color than inorganic yellow iron oxide. Furthermore, the organic perylene red tinting agent produces a higher chromaticity final color than the inorganic red iron oxide tinting agent.

Finally, even at five times lower use levels, the Cu phthalocyanine green and blue tinting agents produce higher chromaticity final colors than their respective inorganic tinting agent counterparts. As shown in Table 4, in every case, except for the one involving inorganic bismuth vanadate yellow, the organic pigments produce a final color of higher chromaticity than the inorganic pigments.

TABLE 1

| INGREDIENT | A | B | C |
|---|---|---|---|
| Clear polyester TGIC base | 89.93 | 89.93 | 89.93 |
| Amorphous fumed silica fluidizing additive | 0.07 | 0.07 | 0.07 |
| Iron oxide yellow tinting agent | 10.0 | — | — |
| Bismuth vanadate yellow tinting agent | — | 10.0 | — |
| Bisacetoacetarylide yellow tinting agent | — | — | 10.0 |

TABLE 2

| INGREDIENT | D | E | F | G |
|---|---|---|---|---|
| Clear polyester TGIC base | 95.93 | 95.93 | 89.93 | 97.93 |
| Amorphous fumed silica fluidizing additive | 0.07 | 0.07 | 0.07 | 0.07 |
| Iron oxide red tinting agent | 4.0 | 4.0 | 4.0 | 4.0 |
| Perylene red tinting agent | — | 4.0 | — | — |
| Cobalt nickel zinc titanium oxide green tinting agent | — | — | 10.0 | — |
| Cu phthalocyanine green tinting agent | — | — | — | 2.0 |

TABLE 3

| INGREDIENT | H | I |
|---|---|---|
| Clear polyester TGIC base | 89.93 | 97.93 |
| Amorphous fumed silica fluidizing additive | 0.07 | 0.07 |
| Cobalt aluminum oxide blue tinting agent | 10.0 | — |
| Cu phthalocyanine blue tinting agent | — | 2.0 |

TABLE 4

| TRIAL | COLOR | PIGMENT CHEMISTRY | PIGMENT CONCENTRATION (% of TOTAL FORMULATION) | CHROMATICITY |
|---|---|---|---|---|
| A | Inorganic yellow | Iron oxide | 10 | 25.117 |
| B | Inorganic yellow | Bismuth vanadate | 10 | 69.878 |
| C | Organic yellow | Bisacetoacetarylide | 10 | 59.865 |
| D | Inorganic red | Iron oxide | 4 | 9.537 |
| E | Organic red | Perylene | 4 | 13.016 |
| F | Inorganic green | Co, Ni, Zn, Ti oxide | 10 | 8.543 |
| G | Organic green | Cu phthalocyanine | 2 | 10.902 |
| H | Inorganic blue | Co, Al oxide | 10 | 3.425 |
| I | Organic blue | Cu phthalocyanine | 2 | 7.076 |

We claim:

1. A thoroughly dry mixed particulate coating powder mixture capable of being applied to a substrate to produce a coating having uniform coloring throughout said coating comprising a base composition which comprises a mixture of discrete solid resinous particles and a tinting agent comprising discrete solid organic pigment particles having an average particle size of from about 50 nanometers to about 700 nanometers and further characterized by a maximum particle surface index of about 50, said particle surface index being defined as particle surface index=$D_{50}$ $_x A_s$, where $D_{50} \leq 2.5$; where $D_{50}$=average particle size (microns); and where $A_s$=surface area (m²/g), and said organic pigment particles are present in an effective amount to color said base composition; said base composition having a viscosity of from about 2 to about 85 Pa·s, as measured using an ICI cone plate viscometer set at 160° C.

2. The coating powder composition mixture of claim 1, wherein said solid organic pigment particles are characterized by a maximum surface index of about 25.

3. The coating powder composition mixture of claim 2, wherein said solid organic pigment particles are characterized by a surface index of from about 1 to about 25.

4. The coating powder composition mixture of claim 2, wherein said solid organic pigment particles are characterized by a maximum surface index of about 5.

5. The coating powder composition mixture of claim 1, wherein said resin comprises a thermoplastic resin.

6. The coating powder composition mixture of claim 1, wherein said resin comprises a thermosetting resin and an effective amount of a curing agent to cure said thermosetting resin.

7. The coating powder composition mixture of claim 1, wherein said base composition is clear and has a viscosity of from about 5 to about 50 Pa·s.

8. The coating powder composition mixture of claim 1, wherein said base composition is clear and has a viscosity of from about 5 to about 20 Pa·s.

9. The coating powder composition mixture of claim 1, wherein said base composition is clear and has a viscosity of from about 7 to about 18 Pa·s.

10. The coating powder composition mixture of claim 1 further comprising a dispersing agent.

11. The coating powder composition mixture of claim 10, wherein said dispersing agent has a Mohs hardness of from about 3 to about 7.

12. The coating powder composition mixture of claim 10, wherein said dispersing agent is barium sulfate.

13. The coating powder composition mixture of claim 10, wherein said dispersing agent is sodium potassium alumino silicate.

14. The coating powder composition mixture of claim 1, wherein said organic pigment is present in an amount from about 0.001 wt. percent to about 30 wt. percent, based upon total weight of said coating powder composition mixture.

15. The coating powder composition mixture of claim 14, wherein said organic pigment is present in an amount from about 0.25 wt. percent to about 5 wt. percent, based upon total weight of said coating powder composition mixture.

16. The coating powder composition mixture of claim 1, wherein said organic pigment has a maximum particle size of about 500 nanometers.

17. The coating powder composition mixture of claim 1 further including metal particles.

18. The coating powder composition mixture of claim 17, wherein said particles comprise metal-coated glass.

19. The coating powder composition mixture of claim 18, wherein said particles comprise silver-coated glass.

20. The coating powder composition mixture of claim 17, wherein said particles comprise a metal selected from the group consisting of aluminum, steel, copper, bronze, zinc, and admixtures thereof.

21. The coating powder composition mixture of claim 1, wherein said organic pigment is a member selected from the group consisting of dioxazine violets, Cu phthalocyanine blues, Cu phthalocyanine greens, perylene reds, bisacetoacetarylide yellows, Azo pigment yellows, carbon blacks, and admixtures thereof.

22. A method for preparing a particulate coating powder mixture comprising:
   a) providing a particulate base composition comprising discrete solid resinous particles, said base composition having a viscosity of from about 2 to about 85 Pa·s, as measured using an ICI plate viscometer set at 160° C;
   b) providing a tinting agent comprising discrete solid organic pigment particles having an average particle size of from about 50 nanometers to about 700 nanometers and further characterized by a maximum particle surface index of up to about 50, said particle surface index being defined as particle surface index=$D_{50x}A_s$, where $D_{50} \leq 2.5$; where $D_{50}$=average particle size (microns); and where $A_s$=surface area_($m^2$/g), said organic pigment particles are present in an amount effective to color said base composition; and
   c) dry mixing said particulate base composition and said solid organic pigment particles to form a thoroughly mixed particulate coating powder mixture having a desired color.

23. The method of claim 22, wherein said solid organic pigment particles are characterized by a maximum particle surface index of about 25.

24. The method of claim 23, wherein said solid organic pigment particles are characterized by a particle surface index of from about 1 to about 25.

25. The method of claim 23, wherein said solid organic pigment particles are characterized by a maximum particle surface index of about 5.

26. The method of claim 22, wherein said resin comprises a thermoplastic resin.

27. The method of claim 22, wherein said resin comprises a thermosetting resin and an effective amount of a curing agent to cure said thermosetting resin.

28. The method of claim 22, wherein said base composition is tinted.

29. The method of claim 22, wherein said base composition is clear and has a viscosity of from about 5 to about 50 Pa·s.

30. The method of claim 22, wherein said base composition is clear and has a viscosity of from about 5 to about 20 Pa·s.

31. The method of claim 22, wherein said base composition is clear and has a viscosity of from about 7 to about 18 Pa·s.

32. The method of claim 22 further comprising a dispersing agent.

33. The method of claim 32, wherein said dispersing agent has a Mohs hardness of from about 3 to about 7.

34. The method of claim 32, wherein said dispersing agent is barium sulfate.

35. The method of claim 32, wherein said dispersing agent is sodium potassium alumino silicate.

36. The method of claim 22, wherein said organic pigment is present in an amount from about 0.001 wt. percent to about 30 wt. percent, based upon total weight of said coating powder composition mixture.

37. The method of claim 36, wherein said organic pigment is present in an amount from about 0.25 wt. percent to about 5 wt. percent, based upon total weight of said coating powder composition mixture.

38. The method of claim 22, wherein said organic pigment has a maximum particle size of about 500 nanometers.

39. The method of claim 22 further including metal particles.

40. The method of claim 39, wherein said particles comprise metal-coated glass.

41. The method of claim 40, wherein said particles comprise silver-coated glass.

42. The method of claim 39, wherein said particles comprise a metal selected from the group consisting of aluminum, steel, copper, bronze, zinc, and admixtures thereof.

* * * * *